Figure 1:
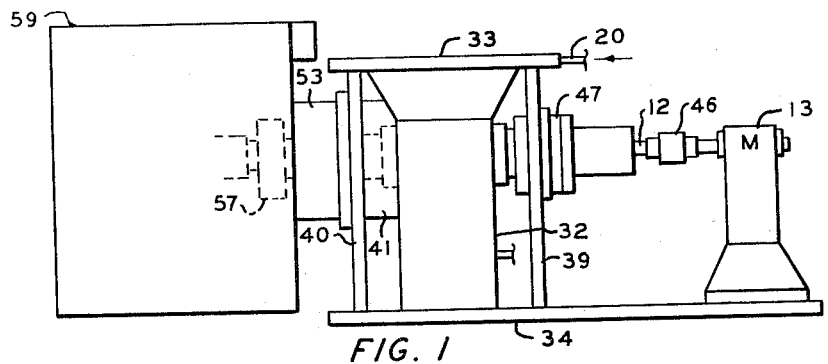

Dec. 27, 1966   F. J. ZAVASNIK   3,293,918
THERMOPLASTIC MATERIAL SAMPLING
Filed May 7, 1964   4 Sheets-Sheet 1

INVENTOR.
F. J. ZAVASNIK
BY Young & Quigg
ATTORNEYS

United States Patent Office 3,293,918
Patented Dec. 27, 1966

3,293,918
THERMOPLASTIC MATERIAL SAMPLING
Frederick J. Zavasnik, Bartlesville, Okla., assignor to Phillips Petroleum Company, a corporation of Delaware
Filed May 7, 1964, Ser. No. 365,709
10 Claims. (Cl. 73—422)

This invention relates to a method and apparatus for sampling flowing solid thermoplastic material. In another aspect, this invention relates to a method and apparatus for continuously sampling a flowing thermoplastic particle stream. In yet another aspect, this invention relates to a method and apparatus for monitoring a flowing thermoplastic particle stream.

In the production of solid particle form thermoplastic materials, the product particles are passed into storage vessels or containers. The storage vessels or containers are sampled and the samples laboratory tested to determine product quality. Approximately two hours is normally required to obtain a sample and determine, for example, by laboratory tests the melt index of the thermoplastic material. The delay is highly significant and unsatisfactory when attempting to control the production of the thermoplastic material utilizing these laboratory tests as a basis for control.

An additional disadvantage of employing the conventional thermoplastic product control method is that the sample obtained from the sample vessel or sample container may not be representative of the current production being passed into the storage vessel. Thus, any changes effected in the production of the thermoplastic material as a result of the laboratory tests may result in the continuation of the production of off-test thermoplastic material or, in some cases, increasing the deviation from specification of the product thermoplastic material.

In those cases wherein the thermoplastic product material is a polymer subject to degradation upon exposure to air, yet another disadvantage of the conventional product control system is readily apparent. Conventional sampling of the storage vessel or container will result in at least partial exposure of the thermoplastic material to air, resulting in product degradation and seriously affecting the subsequent laboratory tests.

Accordingly, an object of my invention is to provide a method and apparatus for sampling flowing solid thermoplastic material.

Another object of my invention is to provide a method and apparatus for continuously sampling a flowing thermoplastic particle stream.

Another object of my invention is to provide a method and apparatus for continuously passing a representative portion of a flowing thermoplastic particle stream to a testing apparatus.

Another object of my invention is to provide a method and apparatus for obtaining a sample of a product thermoplastic material in the absence of air.

Other objects, advantages and features of my invention will be readily apparent to those skilled in the art from the following description, the drawings and appended claims.

By my invention I have provided a method and apparatus for sampling a flowing thermoplastic particle stream wherein a representative portion of said flowing thermoplastic particle stream is continuously and directly introduced into a plasticizing zone and a plasticized thermoplastic material is continuously passed from said plasticizing zone.

By the term "particle" as herein employed, I include those solid thermoplastic materials in the form of pellets or polymer fluff. The sampling process of this invention is broadly applicable to thermoplastic materials. The inventive sampling process is particularly applicable to those thermoplastic materials subject to degradation upon exposure to air and prepared from the polymerization of 1-olefins having a maximum of 8 carbon atoms per molecule. The polymerization product can be a homopolymer or a copolymer, or a mixture thereof. Thus, the invention is applicable to polymers or copolymers of 1-olefins, such as ethylene, propylene, 1-butene, 1-pentene, 4-methyl-1-pentene, 3-methyl-1-butene, 3,3 - dimethyl-1-butene, and the like, polymerized by any suitable procedure.

The inventive sampling process is also applicable to the sampling of thermoplastic materials prepared from the polymerization of monomers having from 4 to 12 carbon atoms per molecule and continuing an active $CH_2{=}C{<}$ group, such as styrene, various alkyl and substituted alkyl styrenes, p-chlorostyrene, p-methoxystyrene, alpha-methylstyrene; acrylic and substituted acrylic acids, and their esters, such as acrylic acid, methacrylic acid, methylacrylate, ethylacrylate, methyl methacrylate, ethyl methacrylate, butyl methacrylate; nitriles such as acrylonitrile, methacrylonitrile; amides, such as methyl acryloamide; ketones, such as methyl vinyl ketone; ethers such as methylvinylether; halides, such as vinylchloride, vinylidene chloride. Suitable polymers can include the polymerizable heterocyclic nitrogen bases of the pyridine and quinoline series; examples of such compounds are 2-methylvinylpyridine, 2-vinyl - 5 - ethylpyridine, 2-methyl - 5 - vinylpyridine, 2-vinyl-4-ethylquinoline, 3-vinyl-6,7-di-n-propylquinoline. Suitable polymers also include those groups prepared by polymerizing the conjugated dienes, a mixture of conjugated dienes or a mixture comprising a conjugated diene and another polymerizable monomer containing the active $CH_2{=}C{<}$ group.

Figure 2:
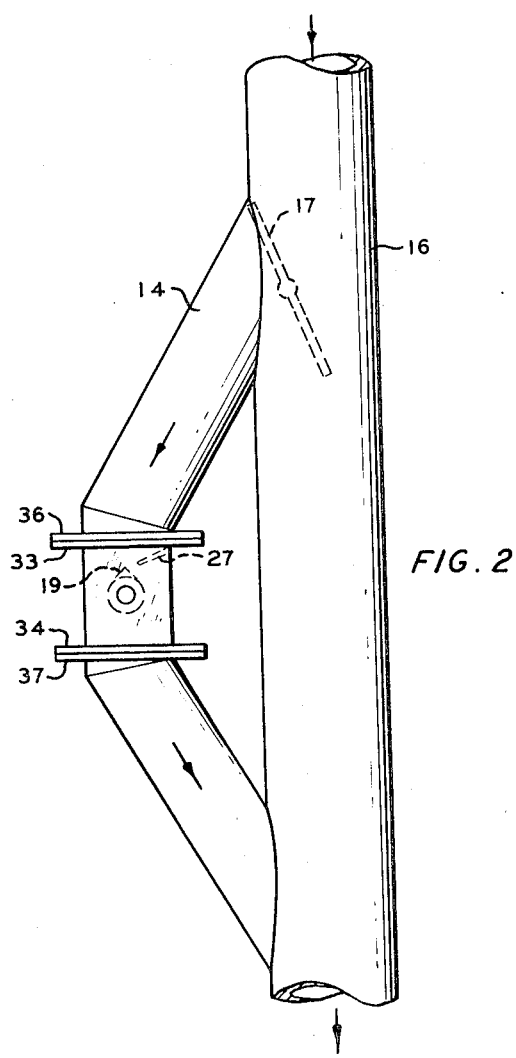
Figure 3:
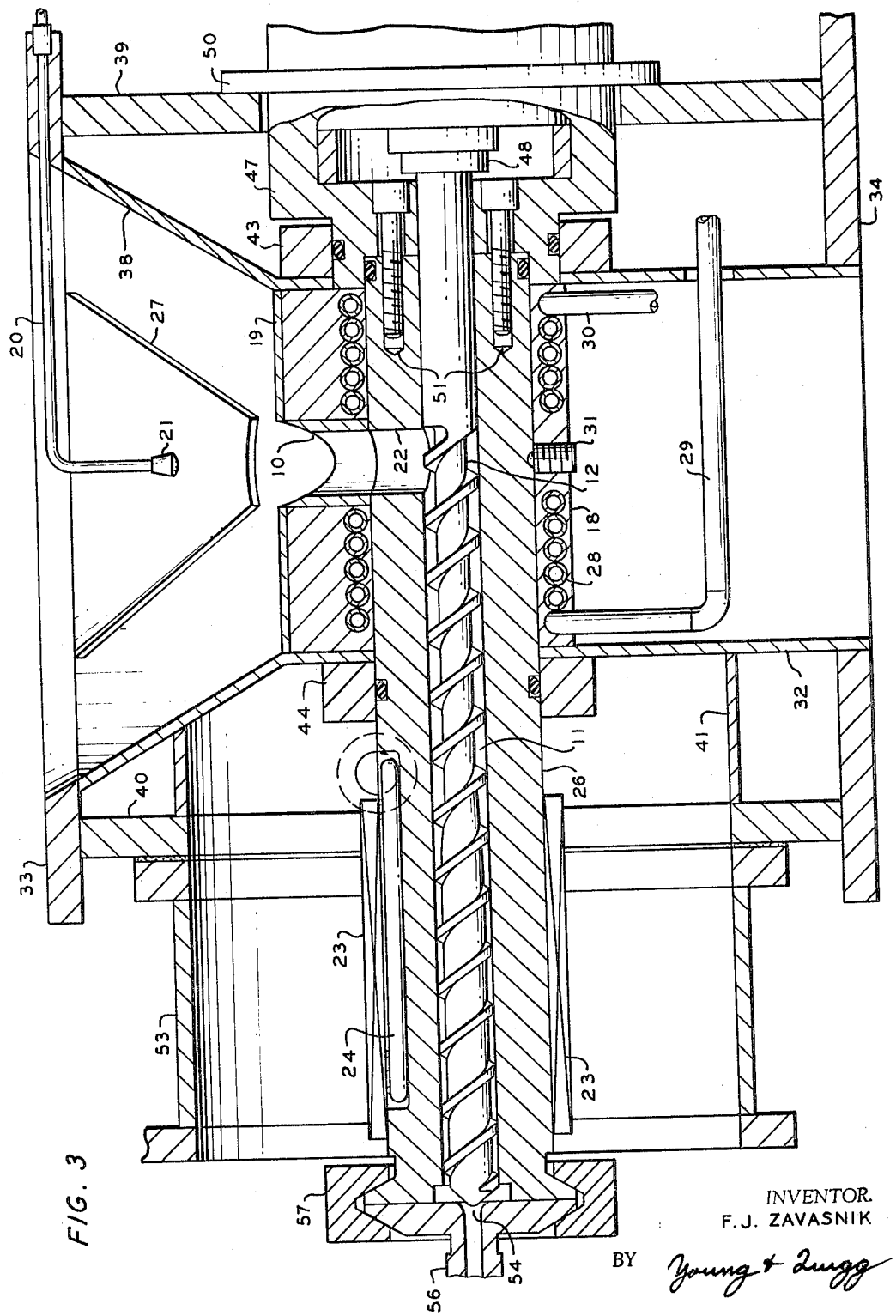
Figure 4:
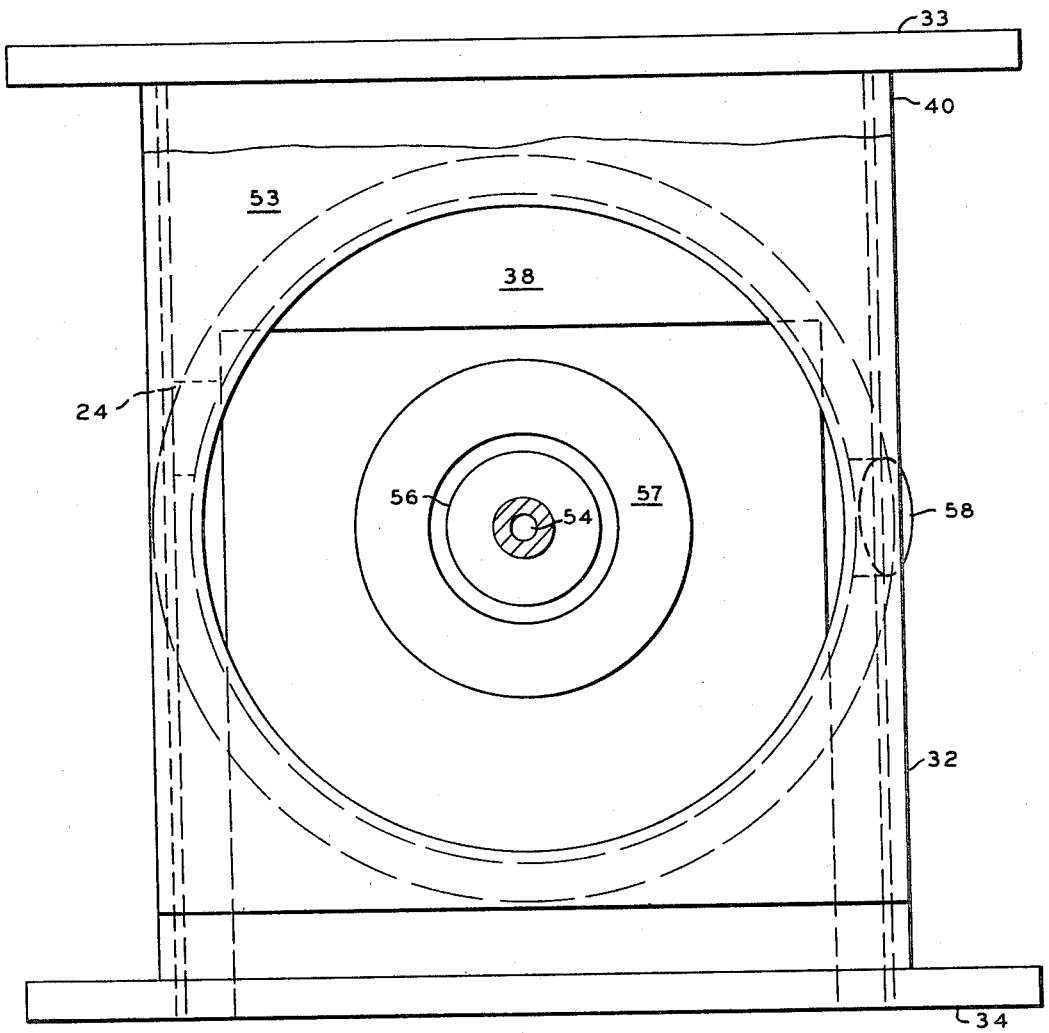
Figure 5:
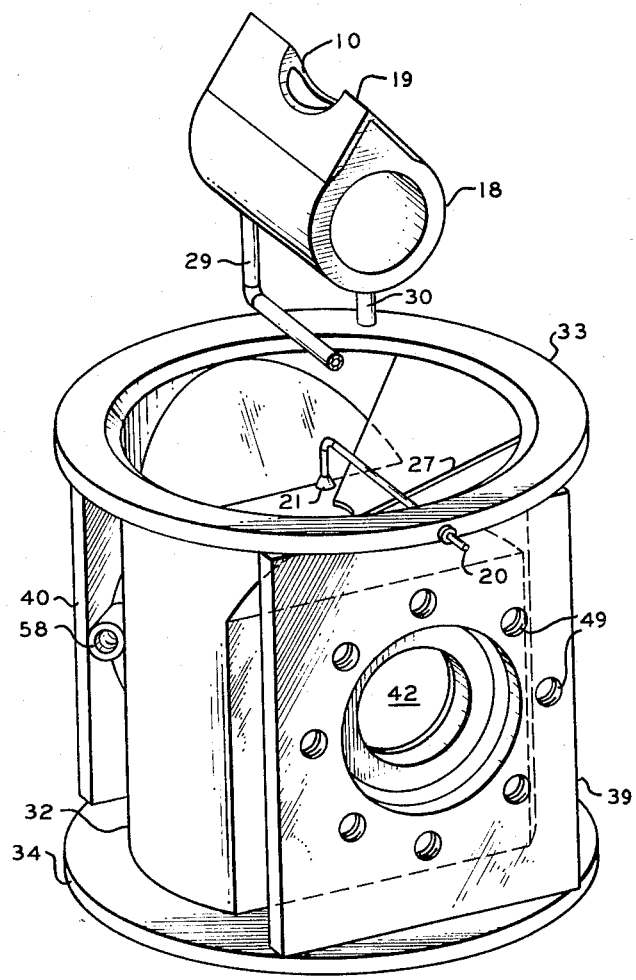

In the drawings:
FIGURE 1 is a view in elevation of the sampling and testing apparatus.
FIGURE 2 illustrates the placement of the inventive sampling apparatus in a vertical conduit.
FIGURE 3 is an elevated cross-section view of the inventive sampling apparatus of FIGURE 1.
FIGURE 4 is a side elevation view of the inventive sampling apparatus of FIGURE 1.
FIGURE 5 is an exploded view of components of the inventive sampling apparatus.

Referring to the drawings, the inventive sampling apparatus comprises a sample inlet 10 in communication with a plasticizing and extrusion chamber 11 via passage 22, said chamber 11 containing a tapered screw member 12 rotated by a motor means 13. As illustrated in FIGURE 2, the sampling apparatus is positioned in a downwardly flowing path of thermoplastic particles flowing through conduit 14. A preferred method of employing the inventive sampling apparatus is to provide a bypass conduit 16 so that upon rotation of baffle member 17, the flowing thermoplastic particles can be directed through conduit 16 during startup, sample equipment removal, or during other periods of operation when sampling of the flowing thermoplastic stream is not required.

As shown in FIGURES 2 and 5, that portion of the flowing thermoplastic particles not entering sample inlet 10 continues to flow uninterrupted through conduit 14, flowing downwardly past and on either side of a transversely positioned housing 18. Housing 18 is formed of solder, containing a circular cooling coil 28, and is provided with a beveled edge 19. The beveled edge 19 prevents the buildup of thermoplastic particles at the sample inlet 10.

It is also within the scope of this invention to pass an inert gas such as nitrogen through conduit 20 and to direct the flowing gas downwardly through a dispersing head 21 into the region surrounding sample inlet 10 so as to aid in the prevention of particle build-up about the inlet 10.

Plasticizing and extrusion chamber 11 positioned within tube member 26 is comprised of a heating section, a compression or plasticizing section, and a metering section. The sample portion of the flowing thermoplastic particles enters housing 18 through sample inlet 10 and passes downwardly through channel 22 into the feed section of plasticizing and extrusion chamber 11. Upon rotation of screw member 12, sample thermoplastic particles are passed from the feed section into the compression or plasticizing section wherein the said thermoplastic particles are subjected to heat and increasing pressure. Increasing pressure is provided by the taper of screw member 12. The plasticizing section is heated by heating elements 23 such as conventional electric heater bands. A desired temperature in the plasticizing zone is maintained by measuring a temperature with a temperature sensitive element such as a thermistor 24 and manipulating the flow of electric current to electrical heater 23 responsive to the temperature measurement.

A baffle member 27 is positioned within conduit 14 to guide at least a portion of the thermoplastic flowing particles to sample inlet 10 thereby insuring a continuous feed of flowing particles to the feed, plasticizing and metering sections of chamber 11.

Positioned within housing 18 and surrounding tube member 26 is a cooling coil 28. A cooling medium is directed to cooling coil 28 via conduit means 29 and withdrawn from cooling coil 28 via conduit means 30. The feed section of chamber 11 is cooled so as to prevent the transfer of heat from the plasticizing section to the feed section, thereby melting thermoplastic particles passed into the sample apparatus via passage means 22 and interrupting the flow of feed particles through passage means 22 and chamber 11. The relative movement of housing 18 with respect to tube member 26 is prevented by a set screw 31, thereby preventing the rotation of housing 18 about tube member 26.

The sampling apparatus is positioned within conduit 14 by means of a flanged framework assembly 32 having flanges 33 and 34 bolted to flange members 36 and 37, respectively. In addition to flanges 33 and 34, flanged framework assembly 32 comprises a conduit member 38, vertical support members 39 and 40, and a laterally disposed circular brace member 41 in fixed relationship and attached to vertical support member 40 and conduit member 38. Tube member 26 is positioned within passageway 42, the passageway extending through vertical support member 39, conduit member 38 and vertical support member 40. Supporting tube member 26 within conduit member 38 are circular flanged members 43 and 44 welded to the outer surface of conduit member 38.

As illustrated in FIGURE 1, motor 13 is attached in fixed relatioinship to and rotates shaft 12 by means of a conventional coupling means 46. A conventional shaft housing assembly 47 containing a bearing member 48 supports rotating shaft 12. Shaft housing assembly 47 is attached in fixed relationship to vertical brace member 39 by threaded bolt members extending through outer flange 50 of shaft housing assembly 47 and threadably engaging openings 49 in vertical support member 39. As illustrated in FIGURE 3, shaft assembly 47 is attached to and in fixed relationship with tube member 26 by means of bolt members 51.

The plasticized thermoplastic material is forced from the metering section of chamber 11 through passageway 54 to a sample testing apparatus 59 such as the melt indexing apparatus of my copending application Serial No. 312,702, filed September 30, 1963, now Patent Number 3,242,720. As illustrated, to prevent exposure of the plasticized thermoplastic material to air, the sample inlet 56 of the testing apparatus is positioned in fixed relationship to and adjacent tube member 26. Sealed relationship of sample inlet 56 with tube 26 is maintained by a conventional circular clamping means 57.

As illustrated in FIGURE 4, a passageway 58 is provided in the sampling apparatus for the insertion of a temperature sensing element for a temperature measurement representative of the temperature of the plasticized thermoplastic material emitted from chamber 11.

As will be evident to those skilled in the art, various modifications of this invention can be made, or followed, in the light of the foregoing disclosure, without departing from the spirit or scope thereof.

I claim:
1. Apparatus comprising a cylindrical member extending transversely across the flow path of thermoplastic particles flowing downwardly through a conduit, the cross-sectional area of said cylindrical member constituting only a portion of the total cross-sectional area of flow of said particles, a tube member positioned within said cylindrical member and extending outwardly from said cylindrical member, an elongated opening extending axially through said tube member, a tapered screw member positioned within said opening, means for rotating said tapered screw member, means for heating that portion of said tube member extending beyond said cylindrical member, a sample inlet positioned in said cylindrical member so as to receive a portion of said downwardly flowing thermoplastic particles, and a passage communicating between said elongated opening and said sample inlet.

2. The apparatus of claim 1 wherein that portion of said cylindrical member exposed to said downwardly flowing thermoplastic particles has a beveled surface.

3. The apparatus of claim 2 to include a cooling means positioned in said cylindrical member and about said tube member.

4. The apparatus of claim 3 to include means for measuring a temperature representative of a temperature within said elongated opening, and means for heating that portion of said tube member extending beyond said cylindrical member responsive to said temperature measurement.

5. The apparatus of claim 4 to include a baffle member positioned so as to channel at least a portion of said downwardly flowing thermoplastic particles to said sample inlet.

6. The apparatus of claim 5 to include means for passing to and dispersing a gas in said conduit in the region surrounding said sample inlet.

7. The apparatus of claim 5 to include testing apparatus positioned adjacent to and in communication with said elongated opening.

8. Apparatus comprising:
 a flow conduit;
 a plasticizing and extrusion chamber outside said conduit adjacent thereto;
 a housing extending transversely across said conduit, the cross sectional area of said housing constituting only a portion of said conduit, said housing having a sample inlet positioned to receive a portion of any thermoplastic particles flowing therein, and a passage communicating between said sample inlet and said plasticizing and extrusion chamber;
 means for transporting thermoplastic material from said sample inlet to said plasticizing and extrusion chamber and through said chamber wherein said material is plasticized;
 means to heat said chamber; and
 means to cool said housing.

9. The apparatus of claim 8 wherein said means for transporting thermoplastic material comprises a screw member extending from within said housing into and substantially through said chamber.

10. A method of sampling a stream of solid thermoplastic material and plasticizing said material, comprising:

introducing a portion of said stream of solid thermoplastic material into a sample inlet within said stream;
transporting said material from said sample inlet through a passage tube and through a plasticizing zone outside but adjacent said stream;
cooling said passage to maintain said material in said stream solid; and
heating said plasticizing zone to plasticize said material therein,
said introducing of the solid, plasticizing, and passing steps are conducted in the absence of air.

References Cited by the Examiner

UNITED STATES PATENTS

| 2,880,615 | 4/1959 | Hardy et al. | 73—422 |
| 2,943,478 | 7/1960 | Brabender et al. | 73—421 |
| 3,138,950 | 6/1964 | Welty et al. | 73—422 |

LOUIS R. PRINCE, *Primary Examiner.*

S. C. SWISHER, *Assistant Examiner.*